Figure 1:
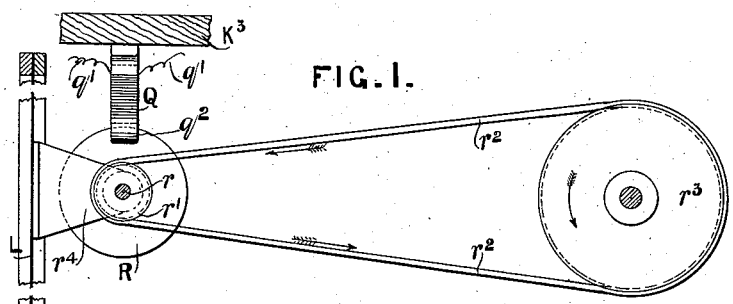

(No Model.) 2 Sheets—Sheet 1.

R. HOPE-JONES.
TELEPHONY.

No. 477,866. Patented June 28, 1892.

Witnesses
James F. Duhamel
Horace A. Dodge

Robert Hope-Jones,
Inventor:
by Dodge Sons
Atty.

(No Model.)  2 Sheets—Sheet 2.

R. HOPE-JONES.
TELEPHONY.

No. 477,866. Patented June 28, 1892.

Witnesses
James F. Duhamel.
Horace A. Dodge.

Inventor:
Robert Hope-Jones,
by Dodge Sons
Attys.

UNITED STATES PATENT OFFICE.

ROBERT HOPE-JONES, OF BIRKENHEAD, ENGLAND.

TELEPHONY.

SPECIFICATION forming part of Letters Patent No. 477,866, dated June 28, 1892.

Application filed September 17, 1891. Serial No. 405,950. (No model.)

*To all whom it may concern:*

Be it known that I, ROBERT HOPE-JONES, electrical engineer, a subject of the Queen of Great Britain, residing at Birkenhead, in the county of Chester, in the Kingdom of England, have invented certain new and useful Improvements in Apparatus for Magnifying Sounds, of which the following is a specification.

This invention relates to apparatus having for its object the magnifying of minute vibrations or impulses, such as those emanating from or set up in a sound-producing or other vibratory body, or in an electro-magnet, electric wire, or the like.

The principle upon which the invention is based consists in transforming (when necessary) the vibrations or impulses to be magnified into a corresponding series of electrical vibrations or impulses, passing such impulses through an electro-magnetic device capable of creating or varying a magnetic field (or fields) in accordance with said impulses, permitting such magnetic field to offer correspondingly-varying amounts of retarding force to the movement of an electric conductor passing through it in a constant direction and driven by an extraneous power, and transmitting to a suitable vibratory diaphragm successive portions of said extraneous motive power, varying in accordance with the power absorbed in overcoming the said varying amounts of retarding force.

In carrying the invention into practical effect the vibrations or impulses to be magnified are transformed when necessary into a corresponding series of electrical vibrations or impulses by means of a suitable electro-magnetic or variable contact device, such as a telephonic transmitter. These electrical impulses are then caused to circulate through the coils of one or more electro-magnets, preferably of the horseshoe type, which may be permanently magnetized or otherwise, whereby a magnetic field (or fields) is (or are) created or varied in intensity. The strength of this magnetic field varies in accordance with the impulses passing through the coils. An electric conductor driven by any suitable extraneous force in a constant direction and moving in either a curved or rectilinear path is so mounted with respect to the magnet or magnets that the whole or a portion of it passes through the magnetic field. The magnetic field opposes to the movement of the conductor a certain amount of retarding force, varying with the variations in the field. Either the magnet or the conductor is mounted upon or otherwise made movable with a secondary diaphragm or similar vibratory body. The various parts are preferably so arranged that the moving conductor or some part movable therewith normally exerts a constant, though generally very slight, push or pull upon the diaphragm in a direction more or less perpendicular thereto. Momentary variations in the amount of the aforesaid magnetic retardation cause corresponding momentary variations in the force of said push or pull, with the result that there is set up in the diaphragm a series of vibrations corresponding to the electrical vibrations or impulses passing round the coils of the magnet. By properly proportioning and arranging the apparatus there may be set up in the diaphragm vibrations exactly corresponding to but of a much greater amplitude than the original sound or other mechanical vibrations. Sounds may thus be produced having the same pitch and more or less of the same quality as the original sounds, but having a much greater intensity or magnitude. To magnify electrical impulses or vibrations the diaphragm or its equivalent is connected with a suitable electric transmitting device, which reproduces in a magnified degree the original impulses, or it may be those passing round the magnet-coils. Other vibratory bodies may, as hereinafter described, be substituted for the secondary diaphragm.

The drawings illustrate a few forms of apparatus embodying the invention.

Figure 3:
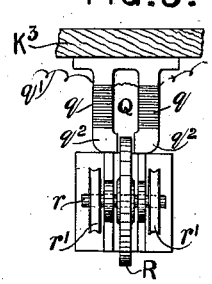
Figure 2:
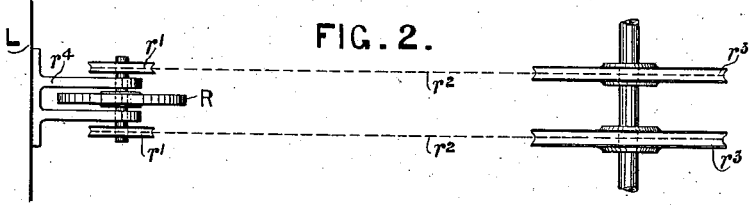
Figure 4:
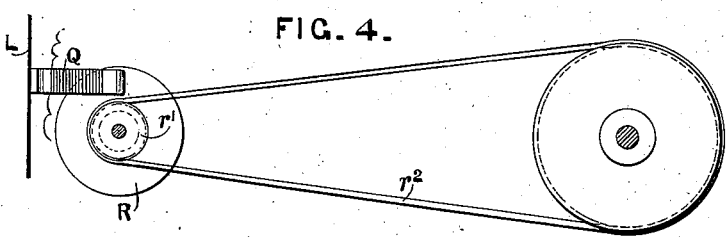
Figure 5:
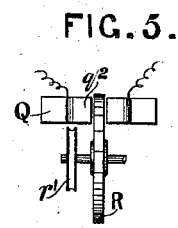
Figures 13, 15:
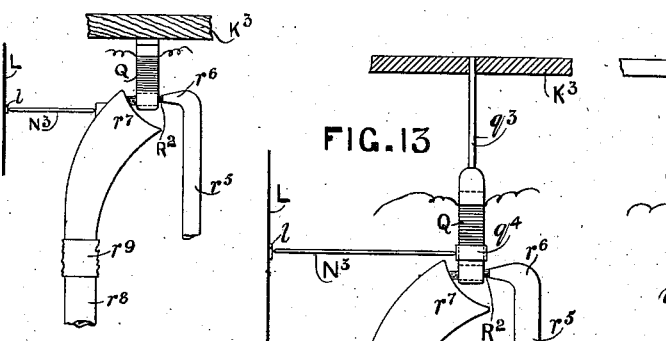
Figure 6:
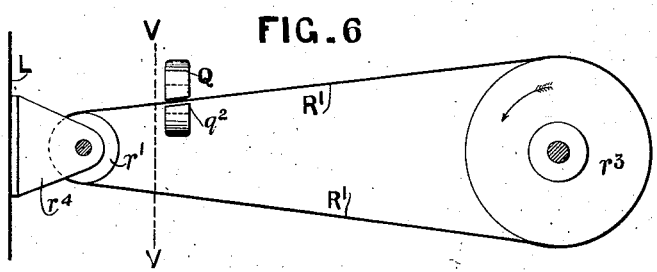
Figure 7:
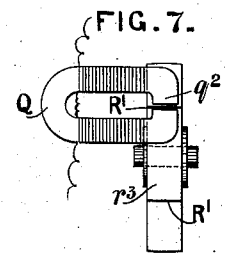
Figure 8:
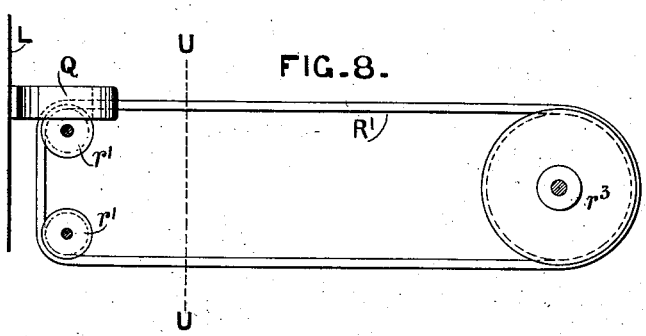
Figure 10:
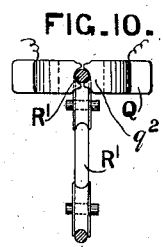
Figure 9:
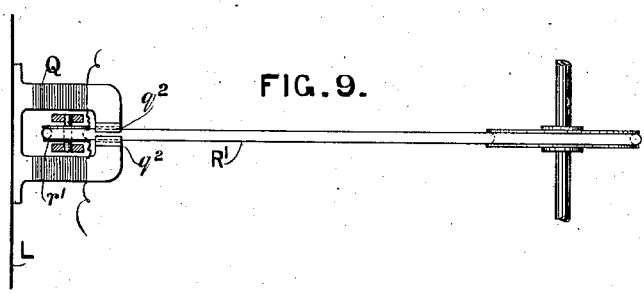
Figure 11:
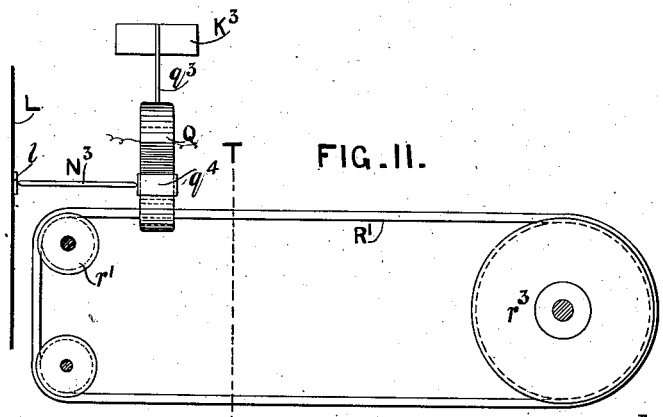
Figure 12:
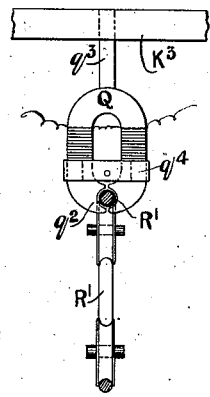

In the drawings, Figures 1 and 2 are side elevation and plan, respectively, of a type of apparatus in which the electric conductor is in the form of a revolving disk, the magnet not being shown in Fig. 2. Fig. 3 is a front elevation of the apparatus shown in Figs. 1 and 2, parts of the driving mechanism being removed. Figs. 4 and 5 are views similar to Figs. 1 and 3, showing a reversed arrangement of the preceding apparatus. Fig. 6 is a side elevation of an apparatus in which the conductor is in the form of an endless traveling band. Fig. 7 is a section on line V V, Fig. 6. Figs. 8 and 9 are respectively elevation and sectional plan of a reversed arrangement of the apparatus shown in Figs. 6 and 7. Fig. 10 is a section on line U U, Fig. 8. Fig. 11 shows in side elevation a modified arrangement of the apparatus seen in Fig. 8. Fig. 12 is a section on line T T, Fig. 11. Fig. 13 is a side elevation, and Fig. 14 a rear elevation with parts removed, of a form of apparatus in which the electric conductor is a continuous jet of liquid. Fig. 15 is a side elevation showing a reversed arrangement of the apparatus seen in Fig. 13.

Referring first more especially to Figs. 1, 2, and 3, Q is an electro-magnet round the coils $q$ of which the electric impulses from a telephonic transmitter or other source are caused to circulate. $q'$ are the connecting-wires for the coils. The magnet is mounted upon a fixed base $K^3$. This magnet may be polarized, if desirable, by a steel polarizer placed in its neighborhood or by causing a uniform current of electricity to circulate round the coils $q$ $q$ or round an independent coil or coils wound on the same core. R is an electric conductor which may be in the form of a sphere or of a circular disk, as shown, and is preferably of copper. The disk R is mounted upon a shaft $r$ in such manner that the poles $q^2$ of the magnet embrace the disk, as seen in Fig. 3. The disk R is rotated in a constant direction and at a more or less uniform speed by any suitable means, as by pulleys $r'$ on its shaft, light smooth bands $r^2$, and driving-pulleys $r^3$, operated by an extraneous force. $r^4$ is a bracket supporting the conductor-shaft $r$ and attached either rigidly or by stout blocks of india-rubber to the secondary diaphragm L or similar vibratory body, preferably at or about its center. Only a portion of the diaphragm is shown; but it is to be understood that its size relative to the other parts of the apparatus is much larger than is depicted in the drawings and that it is supported in any manner which will permit of it vibrating freely—as, for example, at its edges, as shown in Fig. 1. Two sets of driving pulleys and bands are employed, as shown—one on each side of the disk R—in order that the latter may run smoothly and not impart undue vibrations to the diaphragm. The relative positions of the parts and the direction of rotation are preferably such that the pull on the diaphragm acts along lines more or less perpendicular thereto.

The operation of the apparatus is as follows: The tension of the bands $r^2$ or the speed of rotation or both is preferably so adjusted that the bands exert normally a slight but uniform pull upon the diaphragm sufficient to maintain the latter in a taut and sensitive condition. The electric impulses circulating round the coils $q$ make by means of the magnet a magnetic field whose strength varies as the force and duration of said impulses. The variations in the magnetic field offer correspondingly-varying amounts of retarding force to the rotation of the conductor-disk R, and thus cause to be applied to the diaphragm similarly-varying amounts of the motive-power of said disk. In other words, the force of the pull of the bands $r^2$ upon the diaphragm is varied in exact accordance with the impulses passing round the magnet-coils, with the result that there is set up in the diaphragm a series of vibrations similar to the original vibrations or impulses. If the original vibrations are sound or other mechanical vibrations, the diaphragm L reproduces them in a magnified degree. If the electric impulses only are to be magnified, the diaphragm L is connected with an ordinary electric transmitter of proper proportions, (not shown,) which reproduces the impulses in a magnified degree.

In the apparatus shown in Figs. 4 and 5, the electro-magnet Q is mounted upon the diaphragm L, and the disk R and its shaft are mounted upon a stationary support in proximity to the diaphragm. The action of the apparatus is the same as that previously described, the varying retardation offered to the movement of the disk reacting through the magnet to vibrate the diaphragm.

In Figs. 6 and 7 the conductor is shown as an endless traveling band R', supported at one end upon the pulley $r'$, which is mounted upon the bracket $r^4$, attached to the diaphragm. The opposite end of the band is supported upon the driving-pulley $r^3$. The magnet Q is mounted upon a support independent of the diaphragm, and the band R' passes between its poles, as shown, the action of the magnet on the band being similar to that of the magnet on the disk R aforesaid.

In the modified arrangement shown in Figs. 8, 9, and 10 the magnet Q is attached to the diaphragm and the band-conductor R' is mounted independently of the diaphragm and runs between the poles $q^2$ of the magnet, which are hollowed out, as shown in Fig. 10, to embrace the conductor, the latter having in this case a circular cross-section.

Figs. 11 and 12 show a very similar arrangement, in which the magnet Q, instead of being attached directly to the diaphragm is attached by a laterally-flexible stem $q^3$ to the fixed support $K^3$ in such manner that it can be vibrated, as in the case of the magnet shown in Fig. 8, in accordance with the electric impulses circulating round its coils. The vibrations of the magnet are transmitted indirectly to the diaphragm by any suitable mechanical device, such as a post $N^3$, the ends of which are pointed, as shown, and rest the one end within an indentation in a button $l$ on the diaphragm and the other end within an indentation in a cross-piece $q^4$ on the magnet.

Figure 14:
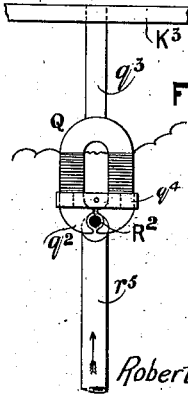

The apparatus shown in Figs. 13 and 14 is the same as that just described, with the exception that the solid band-conductor R' is replaced by a liquid conductor $R^2$ in the form of a continuous jet, preferably of water, which is projected between the hollowed-out poles of the magnet, as in the case of the traveling band R'. $r^5$ is the water-supply pipe provided with a nozzle $r^6$, and $r^7$ is a funnel to receive the water after it has passed the magnet and convey it to the discharge-pipe $r^8$.

In Fig. 15 a reversed arrangement of the preceding apparatus is shown, in which the magnet Q is fixed and the funnel $r^7$ is movable, being connected to the discharge-pipe $r^8$ by a flexible section $r^9$ and to the diaphragm by the post $N^3$.

The secondary diaphragm L when employed for reproducing the magnified sounds directly may be provided with a trumpet-mouth of any suitable shape. (Not shown.) The magnified vibrations of the diaphragm may be transferred to the recording-surface of a phonograph or similar instrument, or they may be employed to work the valve or frictional device of sound-magnifying apparatus such as described in my applications serially numbered 404,654 and 404,656.

The apparatus may be employed in most cases where sound or minute mechanical vibrations require to be magnified. It may also be employed as a relay or sensitive receiver for a telegraphic or telephonic apparatus, or it can be used in conjunction with other electric apparatus in which a series of electric impulses is required to be magnified or rendered visible or audible.

I declare that what I claim is—

1. In an apparatus for magnifying minute vibrations or impulses of the kind described, the combination of an electric conductor moving in a constant direction, a magnetic field varying as the vibrations or impulses to be magnified and opposing to the movement of said conductor correspondingly-varying amounts of electro-magnetic retardation, a body capable of vibrating, as described, and means whereby there is applied to said vibratory body successive portions of the motive power of the conductor varying in accordance with the power absorbed in overcoming said varying amounts of retardation.

2. In an apparatus for magnifying minute vibrations or impulses of the kind described, the combination of the transforming device, whereby the vibrations to be magnified are transformed into a corresponding series of electrical impulses, an electro-magnet capable of producing a magnetic field varying in accordance with such impulses, an electric conductor passing through the magnetic field and driven in a constant direction by an extraneous force, a vibratory body, as described, conveniently mounted with respect to said magnet and conductor, and means whereby the said body is vibrated in accordance with the varying amounts of power expended by the moving conductor in overcoming the varying retarding force opposed to it by the said magnetic field, substantially as described.

3. In an apparatus of the kind described, the combination, with an electro-magnet having a magnetic field varying in accordance with the electrical impulses passing round its core, of a vibratory diaphragm and an electric conductor moving through the magnetic field in a constant direction under the influence of an extraneous force and adapted to impart to the diaphragm a series of pulls or pushes varying in amount as the varying amounts of retarding force opposed to the movement of the conductor by the said varying magnetic field, substantially as described.

4. In an apparatus of the kind described, the combination, with an electro-magnet having a magnetic field varying in accordance with the electrical impulses passing round its core, of a device creating a second but constant magnetic field, a vibratory diaphragm, and an electric conductor moving in a constant direction through both magnetic fields under the influence of an extraneous force and normally exerting a constant pull or push on said diaphragm by reason of the retarding force opposed to the conductor by the said second magnetic field, whereby the variations in the first magnetic field produce corresponding variations in the amount of said pull or push and cause the diaphragm to be vibrated, substantially as described.

5. In an apparatus of the kind described, the combination of an electric conductor moving in a constant direction and exerting a constant but slight push or pull on a diaphragm, tending to distort the same, and a magnetic field varying as the vibrations or impulses to be magnified and opposing to said conductor correspondingly-varying amounts of retarding force, substantially as and for the purpose described.

6. In an apparatus of the kind described, the combination, with an electro-magnet having its magnetic field varying as the vibrations or impulses to be magnified, of an electric conductor moving in a constant direction through said field, a support for said conductor in proximity to the magnet, and a vibratory diaphragm connected to and movable with said magnet or support, substantially as described.

7. In an apparatus of the kind described, the combination, with an electro-magnet having a magnetic field varying as described, of an electric conductor moving through said field in a constant direction, a vibratory diaphragm, and a bracket mounted upon said diaphragm and serving as a support for said conductor, substantially as described.

8. In an apparatus of the kind described, the combination of an electro-magnet having a magnetic field varying as described, of an electric conductor moving through said field in a constant direction and a vibratory diaphragm movable with said magnet, substantially as described.

9. In an apparatus of the kind described, the combination of the electro-magnet Q, having a varying magnetic field, as described, the disk R, of electric conducting material, rotating between the magnet-poles, the bracket $r^4$, supporting the disk, and the vibratory diaphragm L, supporting the bracket, substantially as described.

10. The combination of the electro-magnet Q, metallic disk R, rotating between the poles thereof, diaphragm L, bracket $r^4$, mounted on diaphragm and supporting-disk R, band-wheels $r'$ $r'$, one on each side of the disk and revolving therewith, driving-bands $r^2$, and driving-wheels $r^3$, substantially as described.

11. The combination of the electro-magnet Q, metallic disk R, rotating between the poles thereof, diaphragm L, supporting the magnet, and driving mechanism for rotating the disk in a constant direction, substantially as described.

In testimony whereof I have signed my name to this specification in the presence of two subscribing witnesses.

ROBT. HOPE-JONES.

Witnesses:
WM. P. THOMPSON,
H. P. SHOOBRIDGE.